Patented Jan. 9, 1934

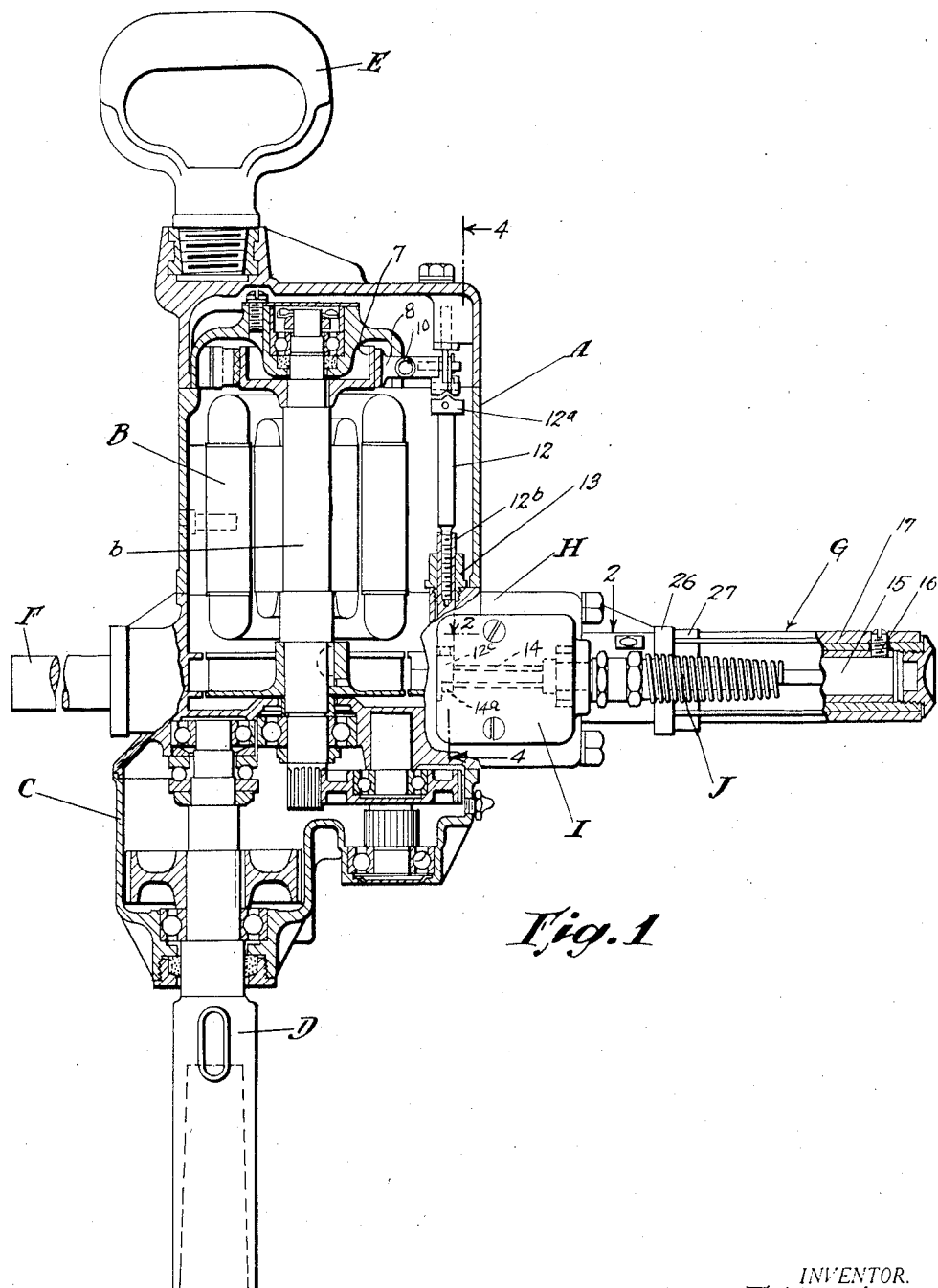

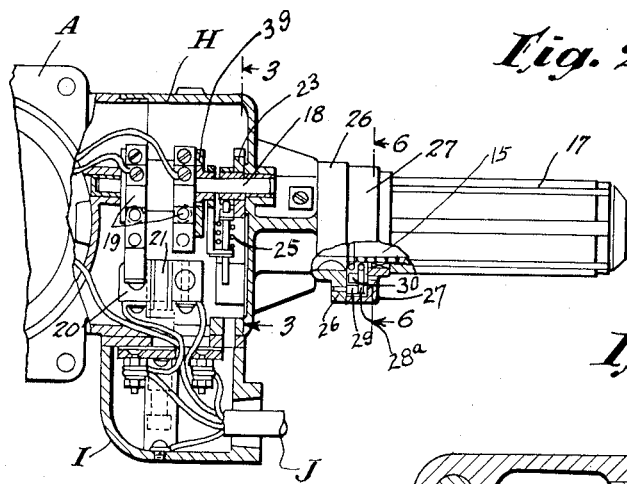
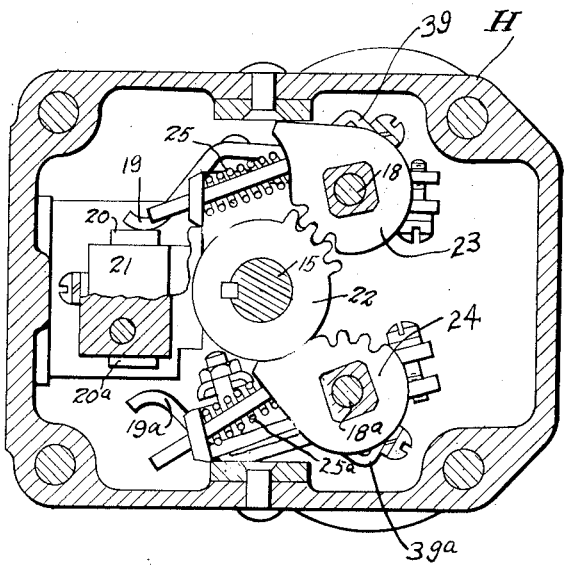
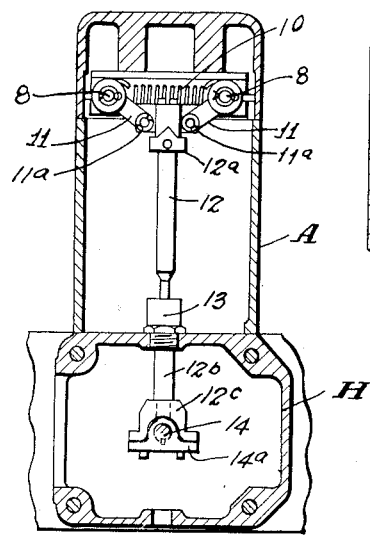
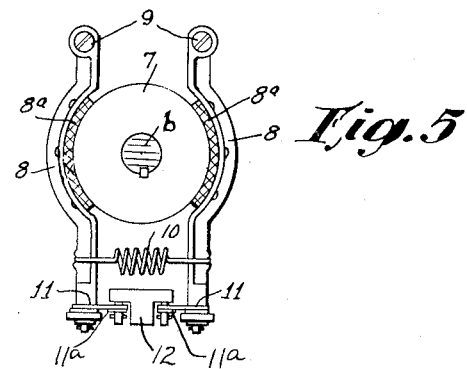
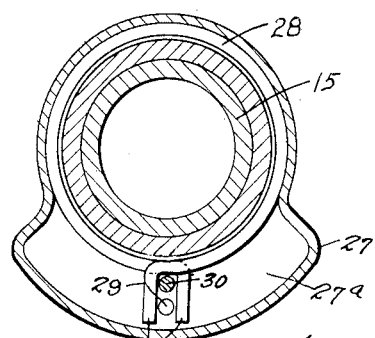

1,942,825

UNITED STATES PATENT OFFICE 1,942,825

CONTROL APPARATUS FOR POWER MACHINES

Leon Fulgence Meunier, Cleveland, Ohio, assignor to Chicago Pneumatic Tool Company, New York, N. Y., a corporation of New Jersey Application September 3, 1930. Serial No. 479,521

9 Claims. (Cl. 192—2)

This invention relates to power machines especially those of the reversible type and more particularly to control apparatus therefor. While having features of general utility it has special application to electrical tools and machines, especially portable tools requiring frequent changes in the direction of operation as for example in staybolt tapping.

One object of the invention is to improve the control mechanism for machines of the described type. Another object is to prevent overheating and destruction of the windings of reversible electric motors. Other objects will be apparent from the detailed description which follows.

In order to illustrate the invention one concrete embodiment thereof is shown in the accompanying drawings, in which:

Fig. 1 is a vertical longitudinal sectional view through a portable electrical tool showing the switch case and the greater part of the control handle in elevation;

Fig. 2 is a fragmentary view partly in section and partly in elevation, the sectional view being on the line 2—2 of Fig. 1;

Fig. 3 is a transverse sectional view on an enlarged scale substantially on the line 3—3 of Fig. 2;

Fig. 4 is a vertical sectional view on the line 4—4 of Fig. 1;

Fig. 5 is a plan view of the motor brake mechanism; and

Fig. 6 is an enlarged transverse sectional view on the line 6—6 of Fig. 2.

The embodiment of the invention chosen for the purpose of illustration comprises a portable electrical machine having a motor casing A enclosing an electric motor B of any suitable or desired type. The armature shaft $b$ is suitably supported by bearings and extends into a gear case C containing reduction gearing such as a common compound gear train through which the torque of motor B is transmitted to a tool shaft or spindle D which projects beyond casing C. Since the parts so far referred to are conventional and may be of any known or suitable size and type, further description thereof is omitted. The machine is provided with suitable handles for manipulating the same such as a spade handle E at the top of motor casing A, a solid handle F at one side and a control handle G at the opposite side. Interposed between control handle G and the tool casing is a switch box H provided at one side with the conduit box I into which the power cable J extends.

In order to prevent excessive loads on the electric motor which result when the switch connections are reversed before the armature shaft $b$ can be stopped and which tend to overheat and burn out the windings, automatically operating brake means are provided for engagement with a brake drum 7 keyed to the upper end of armature shaft $b$ (Figs. 1 and 5). This means comprises brake arms 8 pivoted at one end to the motor casing at 9 and having a retracting spring 10 pulling the opposite ends of the arms together so as to maintain the brake linings 8a normally in contact with brake drum 7. To permit motor B to operate freely suitable means are provided for releasing the brake mechanism comprising toggle levers 11 pivotally mounted on the free ends of brake arms 8 and having rollers 11a engaging the end of a vertically reciprocable member 12 having a stop collar 12a. To provide adjustment for wear, member 12 may be in sections 12 and 12b in threaded engagement, the latter part 12b projecting through a guide member or bushing 13 into switch case H (Figs. 1 and 4) and having its lower end formed with a socket member or saddle 12c partly encircling a rotatable shaft 14 having a cam member 14a keyed thereto and engaging socket member 12c. When shaft 14 is rotated, cam 14a acts through socket or saddle member 12c to lift reciprocating member 12, 12b whereupon the stop member 12a thereon acts upon toggle levers 11 to spread brake arms 8 apart and release the brake.

The releasing of the brake is arranged to be accomplished just before or at the time when motor B is put in operation through the closing of the switch and the brake goes into action to stop armature shaft $b$ as soon as the switch connections are broken. To this end shaft 14 is a part of or an extension on switch control shaft 15 (Figs. 1 and 3). To permit convenient rotation of control shaft 15, the latter is connected by a screw 16 extending through a slot in handle G and engaging a handle sleeve 17. The switch mechanism controlled by shaft 15 and handle sleeve 17 is of the duplex reversing type and comprises stub shafts 18 and 18a (Figs. 2 and 3) carrying contacts 19 and 19a respectively for engagement with suitable cooperating contacts 20 and 20a on block 21. Control shaft 15 has an intermittent gear member 22 which selectively engages cooperating intermittent gear members 23 and 24 on shafts 18 and 18a respectively. Whereupon the contacts 19, 20 and 19a, 20a may be engaged with a snap action through known means including springs 25 and 25a which are compressed and off-centered to produce a lag in the throw of the supports 39 and 39a for contacts 19 and 19a respectively, which supports are loosely mounted on shafts 18 and 18a.

Fig. 3 shows the position of the switch parts when the motor B is running in the forward or tapping direction and is accomplished by rotating handle sleeve 17 and control shaft 15 in a counter-clockwise direction. Shaft 14 and cam 14a will have been moved some 45° from the neutral position shown in Fig. 4 to lift reciprocating member 12, 12b to release the brake so that the motor may operate freely. If then the motor is to be reversed, handle sleeve 17 and control shaft 15, 14 are rotated in a clockwise direction with the result that switch contacts 19 and 20 are opened by the time intermittent gear 22 runs out of mesh with forward switch gear 23. In its neutral position the teeth on gear 22 are intermediate gears 23 and 24 and out of mesh with both. This is the neutral position which corresponds to the position of the parts shown in Figs. 4 and 5 where reciprocating member 12, 12b has been allowed to drop to set the brake arms 8 and stop the motor shaft b. On turning control shaft 15 further in a clockwise direction, intermittent gear 22 meshes with intermittent gear 24 to throw the reversing switch into operation and at the same time extension shaft 14 acts through cam 14a to again lift reciprocating member 12, 12b and release the brake.

As a further safeguard to the operator and to the work, handle control sleeve 17 is arranged to operate as a safety handle so that from either running position it will automatically return to neutral position if released. To this end switch casing H carries a stationary plate 26 keyed thereto and rotary sleeve 17 has a cooperating plate 27 keyed thereto. Plate 27 is undercut (Fig. 6) to provide a recess for a coil spring 28 which encircles handle G and the undercut is enlarged and extended in a circumferential direction as indicated at 27a in Fig. 6 to permit movement of the radially extending parallel ends 28a of spring 28. A pin 29 on fixed sleeve 26 extends between spring ends 28 as well as a pin 30 on sleeve 27. When sleeve 17 is rotated in either direction, pin 30 on sleeve 27 displaces one of the spring ends 28 within the large recess 27a thereby distorting the spring and storing up energy which is applied by the latter to sleeve 17 through pin 30 when the operator releases the sleeve, thereby restoring pin 30 to radial alignment with fixed pin 29 in which position handle sleeve and the associated switch and brake parts are in neutral position.

While the invention has been herein disclosed in what is now considered a preferred form, it is to be understood that the invention is not limited to the specific details thereof, but covers all changes, modifications and adaptations within the scope of the appended claims.

I claim as my invention:

1. A portable electric tool having a motor, a motor brake, a duplex switch for forward and reverse operation of said motor, a handle on said tool, a control member on said handle, and means actuated by said member for releasing said brake and for operating said switch.

2. A portable electric tool having a motor, a motor brake, a duplex switch for forward and reverse operation of said motor, a handle on said tool, a control member on said handle in the form of a rotary sleeve, and means actuated by said member for releasing said brake and for operating said switch.

3. A portable electric tool having a motor, a motor brake, a duplex switch for forward and reverse operation of said motor, a handle on said tool, a control member on said handle in the form of a rotary sleeve, intermittent gear means operated by said sleeve for actuating said switch, and releasing means for said brake actuated by said sleeve when the latter is turned to switch-closing position.

4. A portable electric tool having a motor, a motor brake, a duplex switch for forward and reverse operation of said motor, a handle on said tool, a control member on said handle in the form of a rotary sleeve, releasing means for said brake including a reciprocable member, and cam means actuated by said sleeve for operating said reciprocable member.

5. In combination, a portable power machine having a reversible prime mover operating a rotary member, brake means for said shaft comprising pivoted arms, resilient means for yieldingly maintaining said arms in engagement with said shaft, a reciprocable member, toggle means operated by said reciprocable member for separating said arms to release said brake means, a reversible control member for the operating medium for said prime mover, and means actuated by said control member on movement of the same in either direction for operating said reciprocable member, whereby to effect a complete release of said brake means.

6. In combination, a portable electric tool having a motor casing, a reversible electric motor therein, a switch casing having switch mechanism for controlling said motor, brake means for said motor, a reciprocable member for controlling said brake means extending into said switch casing, a control shaft for both said switch mechanism and said member extending from said switch casing, and a manually controlled operating handle telescoped over said shaft and having means normally maintaining the same in neutral position.

7. The combination with an electric motor having a hollow handle projecting therefrom, a reversing switch for the motor having a control shaft within said handle, of a sleeve member rotatable on said handle and operatively connected to said shaft, and means yieldingly resisting rotative movement of said sleeve in either direction from a predetermined position and for restoring said sleeve to said predetermined position after rotative movement.

8. In a portable tool, in combination, a reversible prime mover having a rotatable member, a spring-pressed brake for said member, a reversible control for the operating medium for said prime mover, and means including a reciprocable member actuated by said control and directly engaging said brake positively to release the latter when said control is moved to a position to put said prime mover in operation.

9. In combination, a reversible prime mover having a rotatable member, a spring-pressed brake for said member, a rotary control member for the operating medium for said prime mover, means including a reciprocable member disposed at an angle to said control member, and means actuated by said control member for directly engaging said reciprocable member to actuate the latter, when the control member is moved to either of two operating positions.

LEON FULGENCE MEUNIER.